United States Patent Office 3,024,255
Patented Mar. 6, 1962

3,024,255
PROCESS FOR THE PRODUCTION OF ORTHO-QUINONES OF THE NAPHTHALENE SERIES
Karl-Heinz Schündehütte, Karl-Heinz Schmidt, Fritz Suckfüll, Leverkusen, and Horst Nickel, Köln-Stammheim, Germany, assignors to Farbenfabriken Bayer Aktiengesellschaft, Leverkusen, Germany, a corporation of Germany
No Drawing. Filed Nov. 24, 1958, Ser. No. 775,722
Claims priority, application Germany Dec. 23, 1957
3 Claims. (Cl. 260—396)

The present invention relates to a new process for the manufacture of o-quinones of the naphthalene series. It further relates to a process yielding o-quinones of the naphthalene series of high purity in very good yield.

In accordance with the invention it has been found that o-quinones of the naphthalene series of high purity in very good yields are obtainable if o-hydroxy diazonaphthalenes or hydroxy- or amino-naphthalenes are treated in aqueous solution with chlorine or bromine. Instead of chlorine or bromine compounds can also be used which yield chlorine or bromine under the reaction conditions, such as mixtures of chlorates and hydrochloric acid or hypochlorite and hydrochloric acid.

Using o-hydroxy diazo naphthalenes, the reaction proceeds at room temperature or elevated temperature in acid solution or suspension, with splitting off of nitrogen. The completion of the reaction is recognised by the disappearance of the diazo reaction, for example by coupling with resorcinol.

Hydroxy or amino naphthalenes are reacted under the same or similar reaction conditions in acid aqueous solution or suspension. Here also o-quinones of a high degree of purity and in good yields are obtained.

The resulting quinones may be isolated by salting out, e.g. with sodium or potassium chloride. In some cases it has been shown advantageous to employ the reaction solution for further reactions, without intermediate isolation.

Suitable diazo hydroxy naphthalenes are for example 1-diazo-2-hydroxy-naphthalene-4-sulfonic acid, 6-nitro-1-diazo-2-hydroxy-naphthalene-4-sulfonic acid, 6-chloro-1-diazo-2-hydroxynaphthalene-4-sulfonic acid, 1-diazo-2-hydroxynaphthalene-4,8-disulfonic acid, 6-nitro-1-diazo-2-hydroxynaphthalene-4,8-disulfonic acid, and 6-nitro-1-diazo-2-hydroxynaphthalene-8-sulfonic acid.

Apart from amino- or hydroxy-naphthalenes not further substituted, substitution products thereof can also be used, for example those containing sulfonic acid and carboxylic acid, nitro-, or acyloxy groups or halogen atoms, such as 2-hydroxynaphthalene-4-sulfonic acid, 1-hydroxynaphthalene-4-sulfonic acid, 6-nitro-2-hydroxynaphthalene-4-sulfonic acid, 6-nitro-2-aminonaphthalene-4,8-disulfonic acid, 2-amino-5-benzene sulfonyl-hydroxynaphthalene-7-sulfonic acid. In particular the compounds of the β-series yield according to the present process significant yields of 1,2-naphtho-quinones.

The quinones obtainable according to the new process are partly already known. They represent valuable intermediate products for the production of dyestuffs. The following examples are given for the purpose of illustrating the invention without, however, limiting it thereto. The parts by weight and the parts by volume stand in the ratio of grams to millilitres.

Example 1

29.5 parts by weight of the diazo-oxide of 1-amino-2-hydroxy-6-nitronaphthalene-4-sulfonic acid are stirred with 100 parts by volume of water and 25 parts by volume of concentrated hydrochloric acid. Into this suspension chlorine is introduced at temperatures between 30 and 40° C., until a sample no longer couples with resorcinol. The 6-nitro-1,2-naphthoquinone-4-sulfonic acid is separated with sodium chloride, and the separation completed, if necessary, by addition of 25 parts by volume of ethanol, and the product isolated (yield about 70–80% of the theoretical).

If bromine water is used in this example for the oxidation of the diazo-oxide instead of chlorine, by adding dropwise with strong stirring at 30–40° C. to the acid suspension, until coupling with resorcinol no longer occurs, the 6-nitro-1,2-naphthoquinone-4-sulfonic acid thus obtained can be separated with sodium chloride and ethanol and isolated.

If the oxidation of the starting products is carried out in analogous manner with hypochlorite or with sodium chlorate in the presence of excess hydrochloric acid, the o-quinones are likewise obtained in good yields.

Example 2

25 parts by weight of the diazo-oxide of 1-amino-2-hydroxy-naphthalene-4-sulfonic acid are stirred in 100 parts by volume of water and 25 parts by volume of concentrated hydrochloric acid and, as described in Example 1, treated at 35–40° C. with chlorine until the reaction has finished. The 1,2-naphthoquinone-4-sulfonic acid is separated with sodium chloride and isolated.

In the same way the oxidation may be carried out with bromine or bromine water, or with hypochlorite or potassium chlorate in the presence of excess hydrochloric acid, whereby the o-quinone is likewise obtained in very good yields.

Example 3

37.5 parts by weight (0.1 mol) of the diazo-oxide of 1-amino-2-hydroxy-6-nitro-naphthalene-4,8-disulfonic acid are dissolved in 1000 parts by volume of 3% hydrochloric acid and treated with chlorine with stirring at room temperature. As soon as nitrogen no longer escapes and a sample will no longer be salted out with sodium chloride, 20% potassium chloride is added, whereby the quinone precipitates with a red-orange color in about 70% yield. Instead of chlorine, hypochlorite or bromine can be used as oxidation agent.

If 33 parts by weight (0.1 mol) of the diazo-oxide of 1-amino-2-hydroxynaphthalene-4,8-disulfonic acid are used and one proceeds otherwise in a manner analogous to that described in this example the 1,2-naphthoquinone-4,8-disulfonic acid is obtained in likewise good yield.

Example 4

34.8 parts by weight of 6-nitro-2-aminonaphthalene-4,8-disulfonic acid are treated in about 1500 parts by volume of 3% hydrochloric acid with chlorine long enough for a sample not to be diazotizable. Salting out with 20% potassium chloride follows, and the separated 6-nitro-1,2-naphthoquinone-4,8-disulfonic acid is isolated in the form of orange-yellow crystals, which are readily water-soluble.

6-nitro-1,2-naphthoquinone-4,8-disulfonic acid is likewise obtained if 34.9 parts by weight of 6-nitro-2-hydroxynaphthalene-4,8-disulfonic acid are first treated in about 1000 parts by volume 3% hydrochloric acid at room temperature, with chlorine, whereby the solution distinctly brightens, and is then heated 10–15 minutes to 80–90° C., the solution becoming yellow-brown. The solution is cooled, 20% potassium chloride is added and the quinone isolated.

Example 5

30.3 parts by weight of 2-aminonaphthalene-4,8-disulfonic acid, dissolved in 3% hydrochloric acid, are oxidised at room temperature with chlorine. The 1,2-naphthoquinone-4,8-disulfonic acid thus obtainable is isolated as the potassium salt.

If 30.3 parts by weight of 1-aminonaphthalene-4,8-disulfonic acid are used, dissolved in 3% hydrochloric acid, 1,2-naphthoquinone-4,8-disulfonic acid is likewise obtained after oxidation with chlorine. According to this process there are further obtainable From 2-aminonaphthalene-8-sulfonic acid, 1,2-naphthoquinone-8-sulfonic acid;
From 2-aminonaphthalene-5,7-disulfonic acid, 1,2-naphthoquinone-5,7-disulfonic acid;
From 2-aminonaphthalene-1,5,7-trisulfonic acid, 1,2-naphthoquinone-5,7-disulfonic acid;
From 1-aminonaphthalene-8-sulfonic acid, 1,2-naphthoquinone-8-sulfonic acid;
And from 1-aminonaphthalene-4-sulfonic acid, 1,2-naphthoquinone-4-sulfonic acid.

Example 6

Chlorine is led into a hydrochloric acid solution of 30.4 parts by weight of 2-hydroxynaphthalene-4,8-disulfonic acid until the naphthol can no longer be detected, and the solution is then heated at room temperature for 10 minutes at 80–90° C. After cooling, the 1,2-naphthoquinone-4,8-disulfonic acid is isolated as the potassium salt as in Example 5.

Example 7

22.4 parts by weight of 2-hydroxynaphthalene-4-sulfonic acid are dissolved in 200 parts by volume of water and 25 parts by volume of hydrochloric acid (19° Bé.). Chlorine is led into this solution at room temperature until the naphthol can no longer be detected. After brief heating to about 80° C. the 1,2-naphthoquinone-4-sulfonic acid is separated with sodium chloride and then isolated.

The oxidation can also be carried out with bromine or chlorine yielding agents, as with mixtures of hypochlorite or potassium chlorate and hydrochloric acid.

If instead of the 2-hydroxynaphthalene-4-sulfonic acid the equivalent quantity of 1-hydroxynaphthalene-4-sulfonic acid is used, the same quinone is formed.

If in this example 26.9 parts by weight of 6-nitro-2-hydroxynaphthalene-4-sulfonic acid are used, 6-nitro-1,2-naphthoquinone-4-sulfonic acid is obtained. Oxidation with chlorine yielding agents or with bromine also leads in this case to the same result.

From 2-hydroxynaphthalene-8-sulfonic acid one obtains 1,2-naphthoquinone-8-sulfonic acid.

Example 8

37.9 parts by weight of 2-amino-5-benzenesulfonylhydroxynaphthalene-7-sulfonic acid are suspended in 200 parts by volume of water and 50 parts by volume of hydrochloric acid and treated with chlorine at about 40° C. until the oxidation is completed. The quinone of the formula

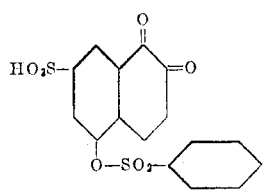

is isolated by salting out with sodium chloride in the form of yellow crystals. It dissolves in water with a yellow coloration.

Example 9

63 parts by weight of the compound

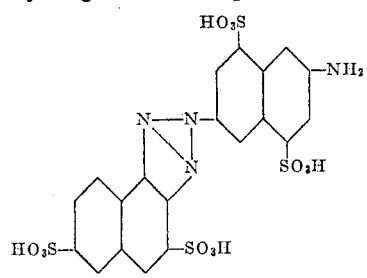

are suspended in 200 parts by volume of water and 50 parts by volume of hydrochloric acid and treated with chlorine at about 30–40° C. until the oxidation has finished. The quinone obtained, of the formula

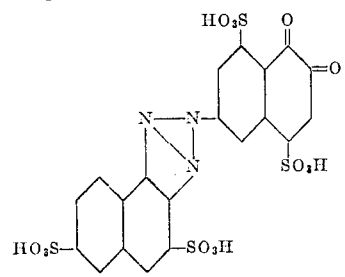

is separated with sodium chloride and isolated. The crystals are colored orange and dissolve in water with yellow coloration.

Example 10

28.3 parts by weight (0.1 mol) of 6-nitro-1,2-naphthoquinone-4-sulfonic acid obtainable according to the instructions of Example 1 as sodium salt, and 31.8 parts by weight of 2-hydrazino-naphthalene-3,6-disulfonic acid are stirred in 500 parts by volume 0.1 N hydrochloric acid for 2 hours at room temperature. The monoazo dyestuff formed, of the formula

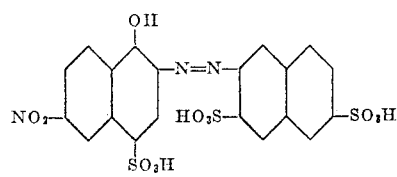

is salted out with sodium chloride and isolated.

The dyestuff paste obtained is dissolved in 1000 parts by volume of water, treated with 140 parts by volume of 20% sodium acetate solution and rendered weakly acid with acetic acid (pH about 5.5). After addition of a solution of 25 parts by weight of crystalline copper sulfate in 140 parts by volume of water, there are added dropwise at 55–60° C. 280 parts by volume of 3% hydrogen peroxide in the course of about 3 hours and the solution further stirred for 1 hour. After the completion of the hydrogen peroxide addition the shade of the solution is changed from red to violet. The oxidatively coppered monoazo dyestuff is separated with sodium chloride and isolated.

The isolated paste is stirred with 1400 parts by volume of water and treated with 130 parts by volume of 40 volume-percent caustic soda and 17 parts by weight of glucose, dissolved in 60 parts by volume of water.

The composition is slowly heated to about 50° C. and held at this temperature long enough to complete the reaction. After cooling to room temperature the dyestuff is separated with sodium chloride, isolated and if desired after-treated with copper salt. The dried dyestuff represents a dark powder which dissolves in water with a blue shade and dyes cotton blue-grey.

Other dyestuffs may be prepared in accordance with the methods described in the following examples.

Example 11

28.3 parts by weight of the sodium salt of 6-nitro-1,2-naphthoquinone-4-sulfonic acid (1/10 mol) and 39.7 parts by weight of 2-hydrazinonaphthalene-3,6,8-trisulfonic acid are stirred in 500 parts by volume of 0.1 N hydrochloric acid at room temperature for 2 hours. The monoazo dyestuff of the formula

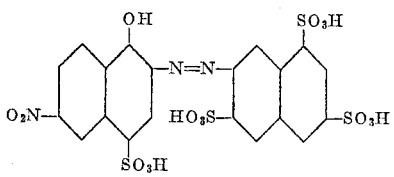

thus formed is salted out with sodium chloride and isolated. By subjecting the dyestuff paste thus obtained to oxidative coppering and reductive linkage as described in Example 10, a dyestuff is obtained which, after drying, is a dark powder dissolving in water with a blue color and dyeing cotton in greenish blue shades.

Example 12

When proceeding as in Example 10, but with the use of 1/10 mol of 1-hydrazinonaphthalene-2,5,7-trisulfonic acid, a dyestuff is obtained which dissolves in water with a blue color and dyes cotton in blue shades.

A condensation, carried out in a similar manner, of 1/10 mol of 6-nitro-1,2-naphthoquinone-4-sulfonic acid with the equivalent amount of 1-hydrazinonaphthalene-2,4,7-trisulfonic acid, leads, after oxidative coppering and reductive linkage, to a dyestuff which dyes cotton in blue shades.

Example 13

28.3 parts by weight of the sodium salt of 6-nitro-1,2-naphthoquinone-4-sulfonic acid (1/10 mol) and 26.8 parts by weight of phenylhydrazine-2,5-disulfonic acid are condensed as described in Example 10 to give the monohydroxyazo dyestuff of the formula

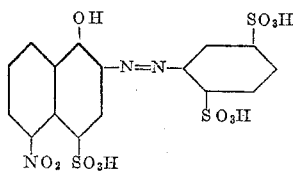

the latter is subjected to oxidative coppering and reductive linkage. The dry dyestuff is a dark powder which dissolves in water with a violet color and dyes cotton in dull violet shades.

Example 14

28.3 parts by weight of 6-nitro-1,2-naphthoquinone-4-sulfonic acid (1/10 mol) and an equivalent amount of 2-carboxy-phenylhydrazine-(1)-sulfonic acid-(5) are stirred in 500 parts by volume of 0.1 N hydrochloric acid at room temperature for 2 hours. The monoazo dyestuff thus formed is separated out by the addition of sodium chloride and isolated.

The paste thus obtained is dissolved in 1200 parts by volume of water; 100 parts by volume of 40% sodium hydroxide solution and a solution of 17 parts by weight of glucose in 50 parts by volume of water are added thereto. The reaction mixture is slowly heated to 48–50° C. and kept at this temperature, until the reaction is completed. The dyestuff is separated out with sodium chloride and isolated.

The dry dyestuff is a dark brown powder which, after dyeing on cotton and after-treatment with copper salts, yields violet dyeings.

If instead of free 2-carboxy-phenyl-hydrazine-(1)-sulfonic acid-(5) there is used the β-N-sulfonic acid thereof having the formula

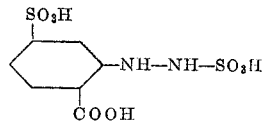

which is obtainable by treating the diazotation mixture of 1-amino-2-carboxybenzene-5-sulfonic acid with sodium sulfite, the same dyestuff is formed.

Example 15

36.3 parts by weight (1/10 mol) of 6-nitro-1,2-naphthoquinone-4,8-disulfonic acid are dissolved in 1700 parts by volume of 20% sulfuric acid and combined with 32 parts by weight (1/10 mol) of 2-hydrazinonaphthalene-4,8-disulfonic acid stirred in 5300 parts by volume of 20% sulfuric acid. After stirring for about 30 minutes, the dyestuff is precipitated with ammonium chloride and isolated.

The condensation product is dissolved in 1000 parts by volume of water with 25 parts by weight of crystalline copper sulfate at 50° C. and a pH value of 5 and slowly treated with 100 parts by volume of 3% hydrogen peroxide. After the addition of potassium chloride, a blue dyestuff precipitates which is isolated. The product is dissolved in 400 parts by volume of 3% sodium hydroxide solution and treated at about 50° C. with 8.5 parts by weight of glucose. After about 30 minutes, the product is rendered acid with acetic acid, salted out with sodium chloride, and precipitated dyestuff is isolated and dried. It dyes cotton in blue shades.

A similar dyestuff is obtainable by using, instead of 2-hydrazinonaphthalene-4,8-disulfonic acid, 32 parts by weight of 2-hydrazinonaphthalene-3,6-disulfonic acid and otherwise proceeding in the manner indicated above.

Example 16

36.3 parts by weight of 6-nitro-1,2-naphthoquinone-4,8-disulfonic acid are dissolved in 1700 parts by volume of 20% sulfuric acid. To the solution there is added a suspension of 15 parts by weight of 1-carboxy-2-hydrazino-benzene in 2800 parts by volume of 20% sulfuric acid, whereupon a red dyestuff precipitates immediately. This dyestuff is filtered off after brief stirring, re-dissolved in 800 parts by volume of 3% sodium hydroxide solution at about 50° C., and reductively linked by the addition of 8.5 parts by weight of glucose. After about 30 minutes, the product is rendered acid with acetic acid, potassium chloride is added, and the precipitated dyestuff is isolated. When after-treated in substance or on the fibre with copper salts, this dyestuff dyes cotton in violet shades.

Example 17

1/10 mol of 6-nitro-1,2-naphthoquinone-4-sulfonic acid are condensed with the equivalent amount of 2-hydrazinonaphthalene-3,6-disulfonic acid according to the instructions of Example 10. The isolated dyestuff paste is dissolved neutral in 700 parts by volume of warm water, treated with a solution of 41 parts by weight of crystalline sodium sulfide in 100 parts by volume of water and kept at about 55° C., until the reduction of the nitro group into the amino group is completed. The product is isolated by means of hydrochloric acid, and re-dissolved.

The paste of the amino compound thus obtained is dissolved in 700 parts by volume of water, and phosgene is introduced at 30° C. into the soda-alkaline solution until the formation of urea is completed.

The product thus formed is isolated with sodium chloride, the paste is dissolved in 800 parts by volume of water, rendered acid with acetic acid, and 140 parts by volume of 20% sodium acetate solution and a solution of 25 parts by weight of crystalline copper sulfate in 120 parts by volume of water are added. Approximately 280 parts by volume of 3% hydrogen peroxide are then added dropwise at 55–60° C. within 2 hours, until the oxidative coppering is completed.

The dyestuff is separated out with sodium chloride and isolated. After drying, it is a dark powder which dissolves in water with a bluish violet color and dyes cotton in violet shades.

*Example 18*

1/10 mol of 6-nitro-1,2-naphthoquinone-4-sulfonic acid are condensed with the equivalent amount of 2-hydrazino-naphthalene-3,6,8-trisulfonic acid according to the instructions of Example 11. The isolated dyestuff paste is then converted into the aminomonoazo dyestuff by means of sodium sulfide according to the instructions of Example 17, reacted with phosgene to give the urea, and the latter subsequently subjected to oxidative coppering.

The dry dyestuff is a dark powder which dissolves in water with a bluish violet color and dyes cotton in bluish violet shades.

*Example 19*

36.3 parts by weight (1/10 mol) of 6-nitro-1,2-naphthoquinone-4,8-disulfonic acid are condensed according to the instructions of Example 16 with 23.2 parts by weight of 1-carboxy-2-hydrazinobenzene-4-sulfonic acid (1/10 mol) and the product thus obtained is isolated.

The paste is dissolved neutral in 2000 parts by volume of water and after the addition of 14 parts by weight of ammonium chloride, treated at about 40° C. with an aqueous solution of 42 parts by weight of crystalline sodium sulfide. After about 45 minutes, the reaction mixture is rendered acid with acetic acid and the dyestuff is salted out from the clarified solution with potassium chloride.

The isolated paste is dissolved in 700 parts by volume of water and treated with phosgene in a soda-alkaline medium. The precipitated urea derivative is isolated and treated with copper sulfate in an acetic acid medium. The dyestuff is precipitated by the addition of potassium chloride and dyes cotton in bluish red shades.

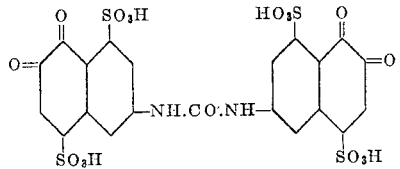

*Example 20*

36.3 parts by weight (1/10 mol) of 6-nitro-1,2-naphthoquinone-4,8-disulfonic acid are reduced. The 6-amino-1,2-dihydroxynaphthalene-4,8-disulfonic acid thus obtained is dissolved soda-alkaline in about 1000 parts by volume of water and treated with phosgene. The urea derivative is isolated with sodium chloride, dissolved acid to Congo in about 2000 parts by volume of water and treated with a sodium nitrite solution, until an excess of nitrite is detected. The quinone derivative thus formed having the formula

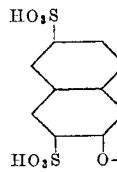

is precipitated with sodium chloride and filtered off with suction.

This compound is condensed with 1-carboxy-2-hydrazino-benzene-4-sulfonic acid in an acid solution as described in Example 19 and converted into the copper complex by means of copper salts. The dyestuff is identical with the product described in Example 19.

*Example 21*

29.5 parts by weight of 6-acetylamino-1,2-naphthoquinone-4-sulfonic acid (1/10 mol) are stirred in 500 parts by volume of 0.1 N hydrochloric acid with the equivalent amount of 2-hydrazinonaphthalene-3,6,8-trisulfonic acid at room temperature for 2 hours. The monoazo dyestuff thus formed is separated out with sodium chloride and isolated.

The paste is dissolved in 500 parts by volume of water with 50 parts by volume of 40% sodium hydroxide solution and stirred at about 80° C., until the saponification of the acetylamino group is completed. The product is then isolated with hydrochloric acid. The conversion of the amino dyestuff into the urea and the oxidative coppering of the latter are carried out as described in Example 17. On cotton, the dyestuff yields bluish violet dyeings which are similar to those of Example 18.

*Example 22*

29.5 parts by weight of 6-acetylamino-1,2-naphthoquinone-4-sulfonic acid are condensed with the equivalent amount of 2-hydrazinonaphthalene-3,6,8-trisulfonic acid according to the instructions of Example 21. The dyestuff is then coppered with oxidation and saponified to give the aminomonoazo dyestuff of the formula

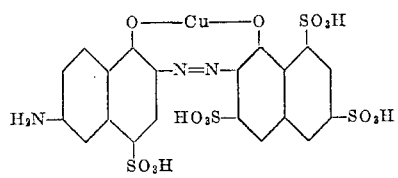

The dyestuff is further diazotized in an acetic acid medium in usual manner, coupled with 1-amino-2-methoxy-5-methylbenzene, diazotized again in an acetic acid medium and coupled with 2-hydroxynaphthalene-3,6-disulfonic acid. After coppering with de-alkylation, there is obtained the dyestuff of the formula

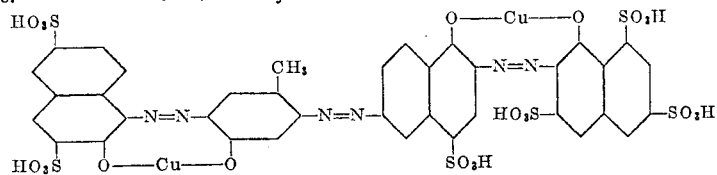

which, after drying, is a dark powder dissolving in water with a blue color and dyeing cotton in bluish grey shades.

*Example 23*

The copper complex compound of 34 parts by weight (0.05 mol) of the nitromonoazo dyestuff of the formula

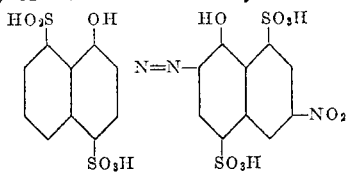

obtainable according to the instructions of Example 15, is stirred in 350 parts by volume of water.

From 7.7 parts by weight (0.05 mol) of 1-amino-2-hydroxy-4-nitrobenzene and 15.2 parts by weight of 2-hydroxy-naphthalene-3,6-disulfonic acid there is prepared by usual methods the copper complex of the monoazo dyestuff of the formula

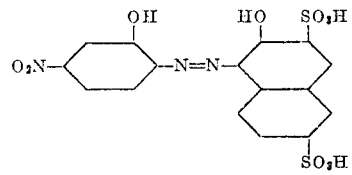

which is stirred in 350 parts by volume of water.

The mixture of the two components is treated with 14 parts by weight of glucose dissolved in 70 parts by volume of water and 70 parts by volume of 40% sodium hydroxide solution, slowly heated to about 60° C. and kept at this tempertaure, until the reaction is completed. The dyestuff thus obtained is salted out with sodium chloride and isolated in usual manner and after-treated with copper salts, if desired.

The dry dyestuff is a dark powder which dissolves in water with a blue color and dyes cotton in blue shades.

When using for the production of the copper complex compound of the dyestuff (II) 1-(4',8'-disulfonaphthyl-[2'])-3-methyl-5-pyrazolone instead of 2-hydroxynaphthalene-3,6-disulfonic acid and otherwise proceeding similarly to this example, a dyestuff is obtained which dyes cotton in bluish grey shades.

If the copper complex compound (II) of this example is replaced by the equivalent amount of the copper complex compound of the formula

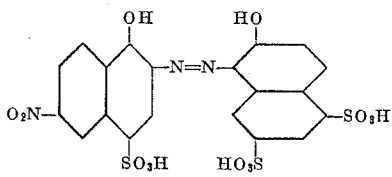

prepared similarly to the instructions of Example 12, a dyestuff is obtained which dyes cotton in blue shades.

*Example 24*

If the dyestuff of Example 12 is de-coppered in usual manner and then treated with nickel salts, a dyestuff is obtained which, after drying, is a dark powder dyeing cotton in reddish blue shades.

We claim:
1. Process for the production of 1,2-naphthoquinones which consists in contacting a naphthalene compound selected from the group consisting of the formulae

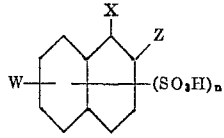

and

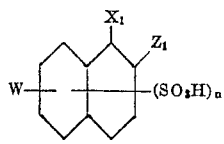

wherein W means a radical selected from the group consisting of hydrogen, nitro, chlorine, —COOH and phenylsulfonyloxy, $n$ stands for an integer from 1 to 3, one of the radicals X and Z means hydroxy and the other diazo, and one of the radicals $X_1$ and $Z_1$ means hydrogen and the other a member selected from the group consisting of —$NH_2$ and —OH; in acid aqueous medium with a halogenation agent selected from the group consisting of chlorine, bromine, chlorates in the presence of hydrochloric acid and hypochlorites in the presence of hydrochloric acid.

2. A 1,2-naphthoquinone of the formula

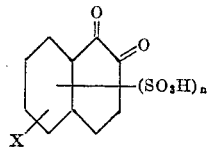

wherein X stands for phenylsulfonyloxy and $n$ stands for an integer from 1 to 3.

3. A 1,2-naphthoquinone of the formula

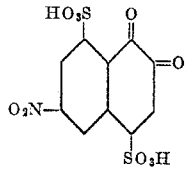

References Cited in the file of this patent
UNITED STATES PATENTS

| | | |
|---|---|---|
| 1,599,444 | Wahl et al. | Sept. 14, 1926 |
| 2,551,647 | Steiger | May 8, 1951 |
| 2,554,543 | Steiger | May 29, 1951 |
| 2,573,136 | Gleim et al. | Oct. 30, 1951 |

FOREIGN PATENTS

| | | |
|---|---|---|
| 414,427 | Germany | May 30, 1925 |
| 415,317 | Germany | June 24, 1925 |
| 415,318 | Germany | June 29, 1925 |
| 1,020,616 | Germany | Nov. 25, 1953 |
| 114,997 | Switzerland | Apr. 1, 1926 |

OTHER REFERENCES

Elsevier's "Encyclopedia of Organic Chemistry," vol. 12B, Elsevier Pub. Co., p. 5646 (1955).